United States Patent
Kim et al.

(10) Patent No.: US 10,069,124 B2
(45) Date of Patent: Sep. 4, 2018

(54) RECHARGEABLE BATTERY HAVING HEAT-RESISTANT INSULATING LAYER

(71) Applicant: SAMSUNG SDI CO., LTD., Yongin-si, Gyeonggi-do (KR)

(72) Inventors: Dae-Kyu Kim, Yongin-si (KR); Takao Abe, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 483 days.

(21) Appl. No.: 14/749,182

(22) Filed: Jun. 24, 2015

(65) Prior Publication Data

US 2016/0087318 A1 Mar. 24, 2016

(30) Foreign Application Priority Data

Sep. 22, 2014 (KR) .................. 10-2014-0126031

(51) Int. Cl.
  *H01M 10/658* (2014.01)
  *H01M 2/12* (2006.01)
  *H01M 2/08* (2006.01)

(52) U.S. Cl.
  CPC ........... *H01M 2/1241* (2013.01); *H01M 2/08* (2013.01); *H01M 2200/106* (2013.01)

(58) Field of Classification Search
  None
  See application file for complete search history.

(56) References Cited

U.S. PATENT DOCUMENTS

| 5,851,693 A | 12/1998 | Sano et al. | |
|---|---|---|---|
| 2007/0154781 A1* | 7/2007 | Choi | H01M 2/0413 429/53 |
| 2009/0297927 A1* | 12/2009 | Kim | H01M 2/0413 429/82 |
| 2012/0114979 A1* | 5/2012 | Kim | H01M 2/1241 429/7 |

FOREIGN PATENT DOCUMENTS

| KR | 10-1996-0036184 A | 10/1996 |
|---|---|---|
| KR | 10-2000-0014671 A | 3/2000 |
| KR | 10-2001-0056032 A | 7/2001 |
| KR | 10-0601521 B1 | 7/2006 |
| KR | 10-2011-0046871 A | 5/2011 |
| KR | 10-2013-0025198 A | 3/2013 |

* cited by examiner

Primary Examiner — Barbara Lee Gilliam
Assistant Examiner — Adam A Arciero
(74) Attorney, Agent, or Firm — Lee & Morse, P.C.

(57) ABSTRACT

A rechargeable battery includes an electrode assembly including a positive electrode and a negative electrode, a case for accommodating the electrode assembly, a cap plate combined to the case, a vent plate disposed under the cap plate and formed with a notch, a middle plate disposed under the vent plate, and a heat-resistant insulating layer disposed between the vent plate and the middle plate.

11 Claims, 4 Drawing Sheets

RECHARGEABLE BATTERY HAVING HEAT-RESISTANT INSULATING LAYER

CROSS-REFERENCE TO RELATED APPLICATION

Korean Patent Application No. 10-2014-0126031, filed on Sep. 22, 2014, in the Korean Intellectual Property Office, and entitled: "Rechargeable Battery Having Heat-Resistant Insulating Layer," is incorporated by reference herein in its entirety.

BACKGROUND

1. Field

Embodiments relate to a rechargeable battery having a heat-resistant insulating layer

2. Description of the Related Art

A low-capacity rechargeable battery may be used in small portable electronic devices such as mobile phones, notebook computers, and camcorders, while a high-capacity rechargeable battery may be used as a power source for driving motors of a hybrid vehicle, an electric vehicle, and the like.

The rechargeable battery may be used in small electronic devices as a single cell battery or in motor-driving power sources, etc., as a battery module in which a plurality of cells are electrically connected.

The above information disclosed in this Background section is only for enhancement of understanding of the background of the invention and therefore it may contain information that does not form the prior art that is already known in this country to a person of ordinary skill in the art.

SUMMARY

Embodiments are directed to a rechargeable battery, including an electrode assembly including a positive electrode and a negative electrode, a case for accommodating the electrode assembly, a cap plate combined to the case, a vent plate disposed under the cap plate and formed with a notch, a middle plate disposed under the vent plate, and a heat-resistant insulating layer disposed between the vent plate and the middle plate.

A lower insulating member may be provided between the heat-resistant insulating layer and the vent plate.

The heat-resistant insulating layer may be formed of a polyimide-based resin.

The heat-resistant insulating layer may have a higher melting point than the lower insulating member.

The heat-resistant insulating layer may be coated on the middle plate to be formed thereon.

The heat-resistant insulating layer may be formed as a film and adhered to the middle plate.

The vent plate may include a groove portion that protrudes towards an interior of the rechargeable battery, a connection protrusion that protrudes towards the interior from a center of the groove portion, and a notch that is formed around the connection protrusion.

The middle plate may include a through-hole through which the connection protrusion of the vent plate is inserted, and ventilation holes formed at an outer side of the through-hole to deliver pressure to the vent plate.

The heat-resistant insulating layer may include a first hole that is aligned with the through-hole of the middle plate, and respective second holes that are aligned with respective ventilation holes of the middle plate.

The heat-resistant insulating layer may include an inner insulating portion that protrudes into the through-hole of the middle plate and is attached to an inner circumferential surface of the through-hole of the middle plate.

The rechargeable battery may further include a lead tab, the lead tab being electrically coupled to the positive electrode and fixed to the middle plate, and a sub-plate under the middle plate, the sub-plate being welded to the middle plate and the connection protrusion.

The lower insulating member may be formed to have a ring shape, and may include a groove portion, the groove portion receiving an inwardly-protruding stepped portion of the vent plate, an opening at a center of the groove portion, and a flange connected to an upper end of the groove portion.

BRIEF DESCRIPTION OF THE DRAWINGS

Features will become apparent to those of skill in the art by describing in detail example embodiments with reference to the attached drawings in which.

DETAILED DESCRIPTION

Figure 1:
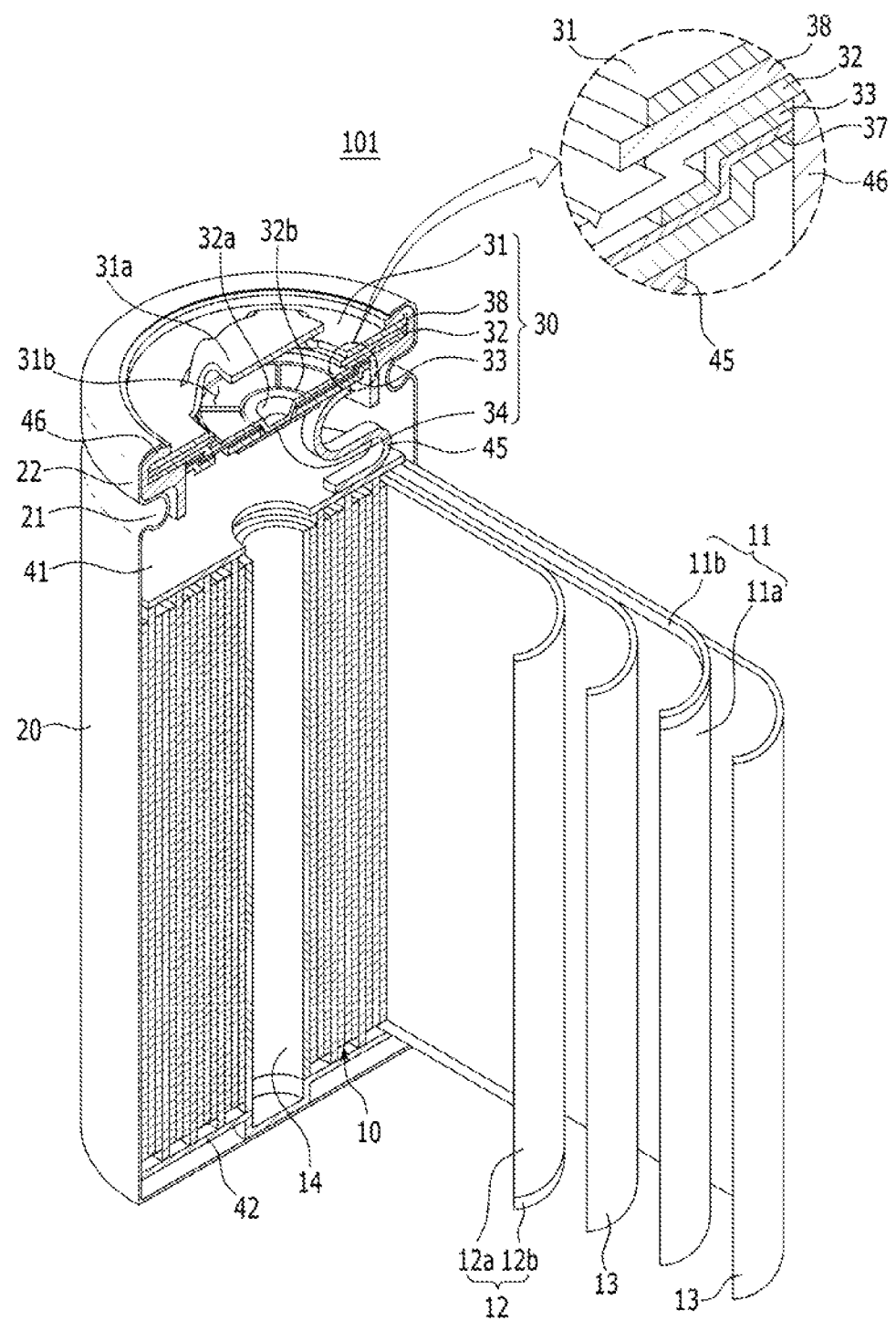
FIG. 1 illustrates a cutaway perspective view of a rechargeable battery according to a first example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art.

In the drawing figures, the dimensions of layers and regions may be exaggerated for clarity of illustration. Like reference numerals refer to like elements throughout.

FIG. 1 is a cutaway perspective view of a rechargeable battery according to a first example embodiment.

In the example embodiment shown in FIG. 1, the rechargeable battery 101 includes an electrode assembly 10 for generating a current, a case 20 for accommodating the electrode assembly 10, and a cap assembly 30 that is combined to the case 20 to be electrically coupled to the electrode assembly 10.

The electrode assembly 10 includes a positive electrode 11, a separator 13, and a negative electrode 12 that are sequentially disposed.

The electrode assembly 10 may be formed by spirally winding the positive electrode 11, the negative electrode 12, and the separator 13 interposed therebetween as an insulator.

For example, the electrode assembly 10 may be formed to have a cylindrical shape. In the present example embodiment, a core pin 14 is disposed at a center of the cylindrical electrode assembly 10. The core pin 14 has a cylindrical shape, and supports the electrode assembly 10 such that the electrode assembly 10 maintains its cylindrical shape.

The positive and negative electrodes 11 and 12 include coated regions 11a and 12a where an active material is coated on a current collector formed of a thin metal foil, and uncoated regions 11b and 12b where the active material is not coated thereon.

A positive electrode current collecting plate 41 is connected to the uncoated region 11b of the positive electrode 11, and the positive electrode current collecting plate 41 is disposed at an upper end of the electrode assembly 10.

A negative electrode current collecting plate 42 is connected to the uncoated region 12b of the negative electrode 12, and the negative electrode current collecting plate 42 is disposed at a lower end of the electrode assembly 10 and may be attached to a bottom of the case 20 by welding.

In the present example embodiment, the positive electrode current collecting plate 41 is disposed at an upper part and the negative electrode current collecting plate 42 is disposed at a lower part, but the positive electrode current collecting plate 41 may be disposed at the lower part and the negative electrode current collecting plate 42 may be disposed at the upper part.

The case 20 may be formed to have a cylindrical or prismatic shape, one side of which is opened to receive the electrode assembly 10.

In the present example embodiment, the case 20 is connected to the negative electrode current collecting plate 42 to serve as a negative terminal of the rechargeable battery 101, and is formed of a conductive metal such as aluminum, an aluminum alloy, or nickel-plated steel.

In the present example embodiment, after being inserted into case 20, the cap assembly 30 is fixed to the case 20 by a clamping process, and a beading portion 21 and a clamping portion 22 are formed in the case 20.

Figure 2:
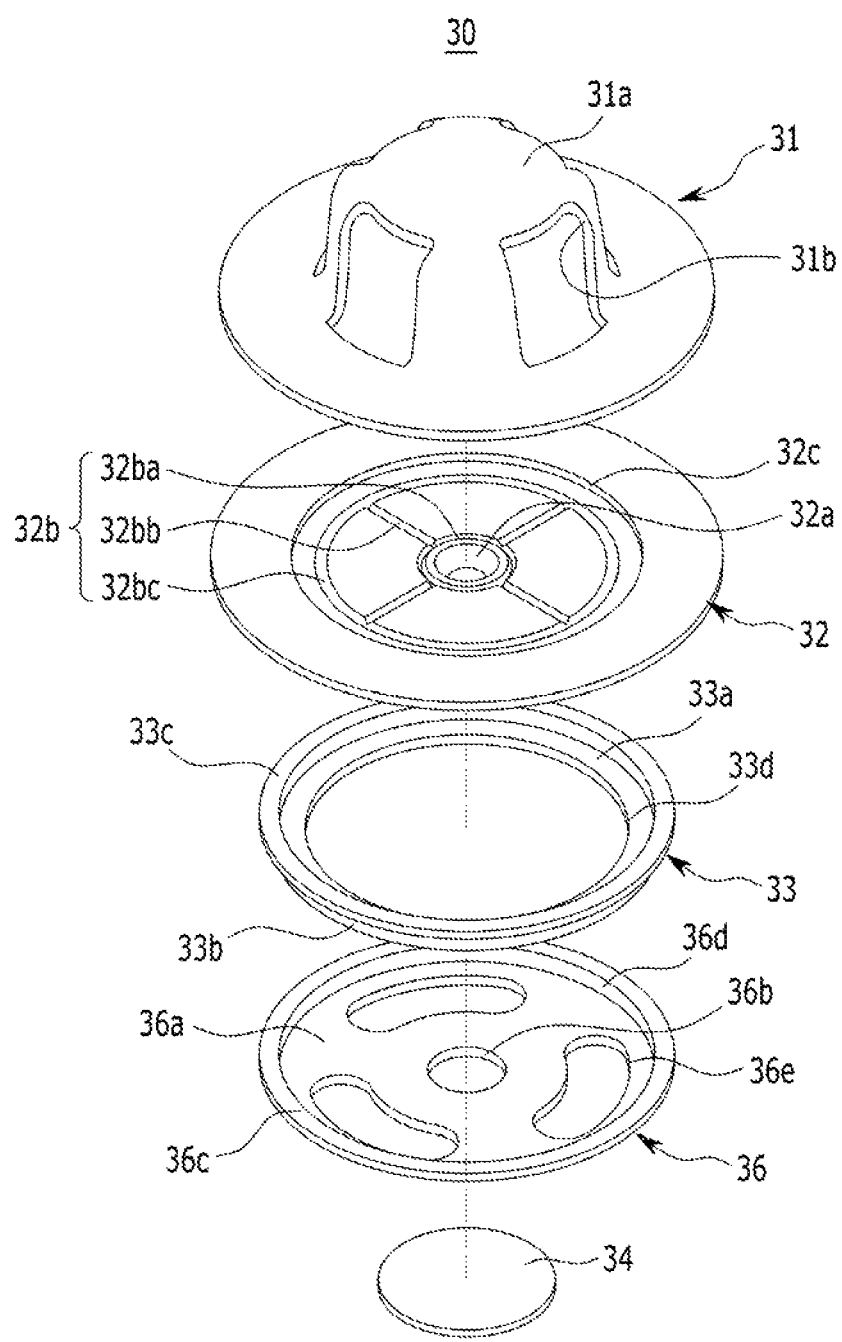
FIG. 2 illustrates an exploded perspective view of a cap assembly according to the first example embodiment.
Figure 3:
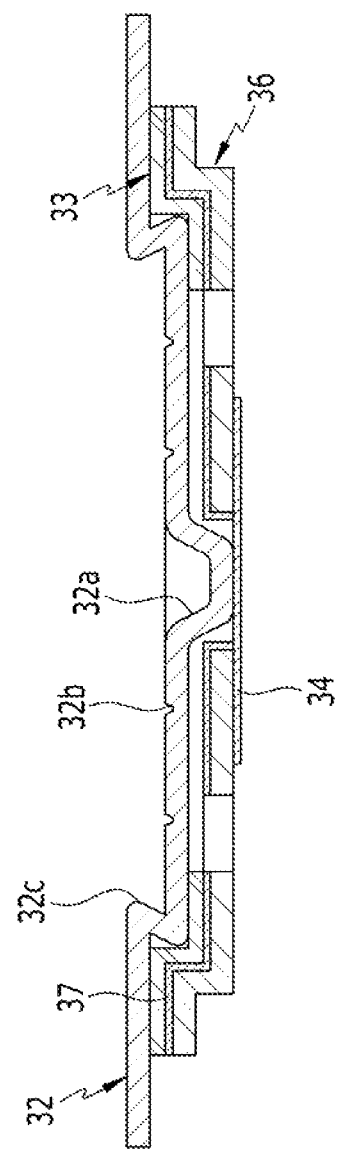
FIG. 3 illustrates a partial cross-sectional view of the cap assembly according to the first example embodiment.

FIG. 2 is a partial exploded perspective view of the cap assembly according to the first example embodiment, and FIG. 3 is a partial cross-sectional view of the cap assembly according to the first example embodiment.

Referring to FIGS. 1, 2, and 3, the cap assembly 30 according to the current first example embodiment is combined to an opened side of the case 20 while interposing a gasket 46 therebetween, thereby sealing the case 20 accommodating the electrode assembly 10 and an electrolyte solution.

According to the present example embodiment, the cap assembly 30 includes a cap plate 31, a vent plate 32, a lower insulating member 33, a middle plate 36, a heat-resistant insulating layer 37 on the middle plate 37 (not shown in FIG. 2), a sub-plate 34, and a positive temperature coefficient (PTC) element 38 (not shown in FIG. 2).

The cap plate 31 is formed as a plate where an upwardly (i.e., away from the interior of the battery) protruding outer terminal 31a and an exhaust hole 31b are formed.

The cap plate 31 is electrically coupled to the positive electrode current collecting plate 41 to serve as a positive electrode terminal in the rechargeable battery 101.

The PTC element 38 is disposed between the cap plate 31 and the vent plate 32. The PTC element 38 has a resistance that increases as temperature increases, and controls a current flow between the cap plate 31 and the vent plate 32. Under a condition where the temperature exceeds a predetermined level, the PTC element 38 has electrical resistance that increases to infinity, and as a result, may cut off the flow of the charging current or discharging current. The PTC element 38 is formed to have a circular ring shape.

The vent plate 32 is disposed under the cap plate 31, and serves to cut off an electrical connection between the electrode assembly 10 and the cap plate 31 under a predetermined pressure condition. The vent plate 32 is ruptured under the predetermined pressure condition to discharge an internal gas of the rechargeable battery 101. The vent plate 32 includes a stepped portion 32c that downwardly protrudes, a connection protrusion 32a that downwardly protrudes toward the sub-plate 34 from a center of the stepped portion 32c, and a notch 32b that is formed around the connection protrusion 32a. The notch 32b may be variously formed such that it is ruptured when an internal pressure of the rechargeable battery 101 increases.

The notch 32b according to the present example embodiment is configured to include an inner circle notch 32ba that is formed around the connection protrusion 32a, a radial notch 32bb that radially extends outwardly from the inner circle notch 32ba, and an outer circle notch 32bc that is connected to outmost ends of the radial notch 32bb.

The vent plate 32 and the sub-plate 34 form a current interrupt device (CID) that cuts off the current when the internal pressure of the rechargeable battery increases. A connector of the CID is formed by a welded portion of the connection protrusion 32a and the sub-plate 34.

When the CID is operated, the connection protrusion 32a and the sub-plate 34 are separated as the connection protrusion 32a is moved upward, and as a result, the electrode assembly 10 and the cap plate 31 are electrically separated. In addition, after the connection protrusion 32a is moved upward, the notch 32b is ruptured to discharge a gas generated inside of the rechargeable battery 101 to the outside through the exhaust hole 31b when the internal pressure of the rechargeable battery 101 further increases.

The sub-plate 34 is formed to have a circular plate shape, and faces the vent plate 32 to be electrically coupled to the connection protrusion 32a. The sub-plate 34 is bonded to the middle plate 36 by welding, and is electrically coupled to the electrode assembly 10 through the middle plate 36. The middle plate 36 is electrically coupled to the vent plate 32 only through the sub-plate 34, such that the CID can be operated by the sub-plate 34 being separated from the vent plate 32.

According to an example embodiment, the lower insulating member 33 is provided under the vent plate 32. The lower insulating member 33 is formed of a polymer having an electrically insulating property, and is interposed between the vent plate 32 and the middle plate 36.

The lower insulating member 33 is formed to have a ring shape, a center of which is formed with an opening 33d. The lower insulating member 33 includes a groove portion 33a into which the stepped portion 32c of the vent plate 32 is inserted, and a flange 33c that is formed at an upper end of the groove portion 33a. In addition, an outer wall 33b is formed in the groove portion 33a to couple the groove portion 33a and the flange 33c.

The middle plate 36 is disposed between the vent plate 32 and the sub-plate 34. A through-hole 36b is formed at a center of the middle plate 36 to receive the connection protrusion 32a, and a plurality of ventilation holes 36e are formed at an outer side of the through-hole 36b to deliver the internal pressure of the rechargeable battery 101 to the vent plate 32.

In addition, in the middle plate 36, a recess portion 36a is formed to receive an external circumference of the stepped portion 32c of the vent plate 32. The through-hole 36b and the ventilation holes 36e are formed at a bottom of the recess portion 36a. The recess portion 36a has a support wall 36d that upwardly protrudes, and a flange 36c is formed at an upper end of the support wall 36d to protrude outward.

A lead member 45 is fixed to the middle plate 36 by welding to be electrically coupled to the positive electrode current collecting plate 41. The lead member 45 is bonded to both the positive electrode current collecting plate 41 and the middle plate 36 by welding, thereby electrically coupling the positive electrode current collecting plate 41 and the middle plate 36.

Accordingly, one side of the middle plate 36 is electrically coupled to the vent plate 32 through the sub-plate 34 and the connection protrusion 32a, while the other side is coupled to the positive electrode current collecting plate 41 through the lead member 45.

The positive electrode current collecting plate 41 is electrically coupled to the cap plate 31 through the lead member 45, the middle plate 36, the sub-plate 34, and the vent plate 32.

The heat-resistant insulating layer 37 is provided between the middle plate 36 and the vent plate 32. The heat-resistant insulating layer 37 may be coated on a top surface of the middle plate 36 to be attached thereto, and may be adhered thereto by an adhesive. In another implementation, the heat-resistant insulating layer 37 may be formed as a film.

The heat-resistant insulating layer 37 has a higher melting point than the lower insulating member 33. The heat-resistant insulating layer 37 may be formed of a polymer having a heat-resistant property. For example, the heat-resistant insulating layer 37 may be formed of a polyimide (PI).

The heat-resistant insulating layer 37 is disposed on the top surface of the middle plate 36, and may be attached to the top surface of the middle plate 36 and an inner circumferential surface of the through-hole 36b.

Figure 4:
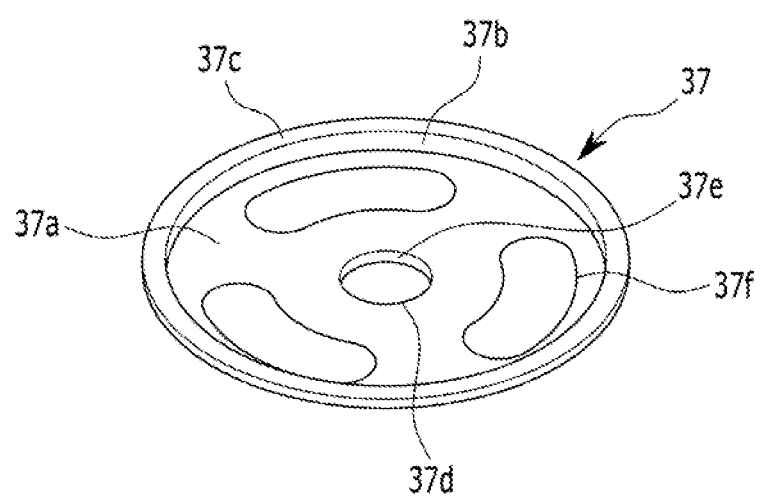
FIG. 4 illustrates a perspective view of a middle plate according to the first example embodiment.

As shown in FIG. 4, the heat-resistant insulating layer 37 includes a groove 37a that is inserted into the recess portion 36a, a support wall 37b that upwardly protrudes from the groove 37a, and a flange 37c that outwardly protrudes from the support wall 37b. In addition, in the groove 37a, a first hole 37d is aligned with the through-hole 36b, and second holes 37f are aligned with the ventilation holes 36e.

The heat-resistant insulating layer 37 includes an inner insulating portion 37e. The inner insulating portion 37e downwardly protrudes in the first hole 37d to be attached to the inner circumferential surface of the through-hole 36b. The inner insulating portion 37e is formed in the heat-resistant insulating layer 37 and is then attached to the inner circumferential surface of the through-hole 36b. Thus, an electrical arc may be prevented from being generated between the connection protrusion 32a and the inner circumferential surface of the through-hole 36b when the connection protrusion 32a is separated from the sub-plate 34.

In further detail, when the connection protrusion 32a and the sub-plate 34 are separated due to the increased internal pressure of the rechargeable battery 101, an arc may be generated. The generated arc may be prevented from being expanded by the heat-resistant insulating layer 37.

By way of summation and review, a rechargeable battery may have a vent plate that is opened as pressure increases. A middle plate may be provided under the vent plate, and an insulating member may be provided between the vent plate and the middle plate. If an arc is generated inside of the rechargeable battery, the insulating member may be melted to cause a short-circuit.

As described above, embodiments may prevent a short-circuit when excessive heat is generated inside a rechargeable battery. According to an example embodiment, the heat-resistant insulating layer is formed above the middle plate. Thus, the middle plate and the vent plate may be prevented from being short-circuited to each other.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

<Description of Symbols>

| | |
|---|---|
| 101: rechargeable battery | 10: electrode assembly |
| 11: positive electrode | 11a: coated region |
| 11b: uncoated region | |
| 12: negative electrode | 12a: coated region |
| 12b: uncoated region | |
| 13: separator | 14: core pin |
| 20: case | 21: beading portion |
| 22: clamping portion | 30: cap assembly |
| 31: cap plate | 31a: outer terminal |
| 31b: exhaust hole | 32: vent plate |
| 32a: connection protrusion | 32b: notch |
| 32ba: inner circle notch | 32bb: radial notch |
| 32bc: outer circle notch | 32c: stepped portion |
| 33: lower insulating member | 33a: groove portion |
| 33b: outer wall | 33c: flange |
| 33d: opening | 34: sub-plate |
| 36: middle plate | 36a: recess portion |
| 36b: through-hole | 36c: flange |
| 36d: support wall | 36e: ventilation hole |
| 37: heat-resistant insulating layer | 37a: groove |
| 37b: support wall | 37c: flange |
| 37d: first hole | 37f: second hole |
| 37e: inner insulating portion | |
| 38: positive temperature coefficient (PTC) element | |
| 41: positive electrode current collecting plate | |
| 42: negative electrode current collecting plate | |
| 45: lead member | 46: gasket |

What is claimed is:

1. A rechargeable battery, comprising:
an electrode assembly including a positive electrode and a negative electrode;
a case for accommodating the electrode assembly;
a cap plate combined to the case;
a vent plate disposed under the cap plate and formed with a notch;
a middle plate disposed under the vent plate, the middle plate having a through-hole in the center thereof, the through-hole penetrating the middle plate;
a first insulating layer disposed between the vent plate and the middle plate; and
a lower insulating member is provided between the first insulating layer and the vent plate, wherein:
the first insulating layer is in contact with sidewalls of the through-hole in the middle plate.

2. The rechargeable battery as claimed in claim 1, wherein the first insulating layer is formed of a polyimide-based resin.

3. The rechargeable battery as claimed in claim 2, wherein the first insulating layer has a higher melting point than the lower insulating member.

4. The rechargeable battery as claimed in claim 1, wherein the first insulating layer is coated on the middle plate to be formed thereon.

5. The rechargeable battery as claimed in claim 1, wherein the first insulating layer is formed as a film and is adhered to the middle plate.

6. The rechargeable battery as claimed in claim 1, wherein the vent plate includes:
   a stepped portion that protrudes towards an interior of the rechargeable battery;
   a connection protrusion that protrudes towards the interior from a center of the stepped portion; and
   a notch that is formed around the connection protrusion.

7. The rechargeable battery as claimed in claim 6, wherein the middle plate includes:
   a through-hole through which the connection protrusion of the vent plate is inserted; and
   ventilation holes formed at an outer side of the through-hole to deliver pressure to the vent plate.

8. The rechargeable battery as claimed in claim 7, wherein the first insulating layer includes:
   a first hole that is aligned with the through-hole of the middle plate; and
   respective second holes that are aligned with respective ventilation holes of the middle plate.

9. The rechargeable battery as claimed in claim 8, wherein the first insulating layer includes an inner insulating portion that protrudes into the through-hole of the middle plate and is attached to an inner circumferential surface of the through-hole of the middle plate.

10. The rechargeable battery as claimed in claim 8, further comprising:
    a lead tab, the lead tab being electrically coupled to the positive electrode and fixed to the middle plate; and
    a sub-plate under the middle plate, the sub-plate being welded to the middle plate and the connection protrusion.

11. The rechargeable battery as claimed in claim 10, wherein the lower insulating member is formed to have a ring shape, and includes:
    a groove portion, the groove portion receiving an inwardly-protruding stepped portion of the vent plate;
    an opening at a center of the groove portion; and
    a flange connected to an upper end of the groove portion.

* * * * *